March 18, 1969     C. A. WEBER     3,433,448

REARVIEW MIRROR SUPPORTING DEVICE

Filed Feb. 10, 1967     Sheet _1_ of 2

*INVENTOR.*
CHARLES A. WEBER
BY *M. A. Hobbs*
ATTORNEY

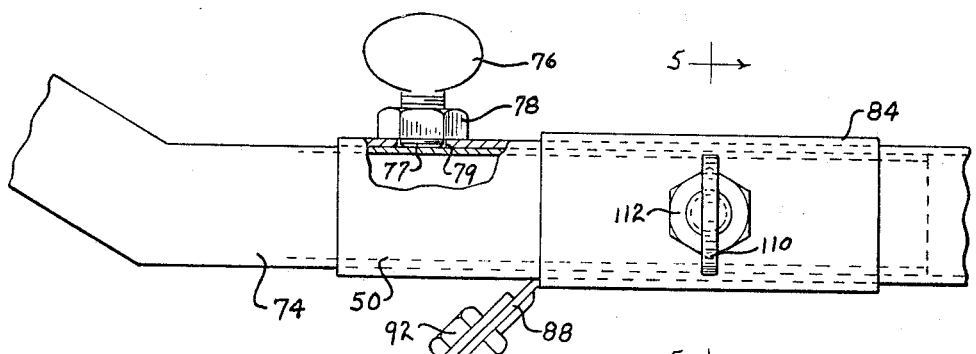
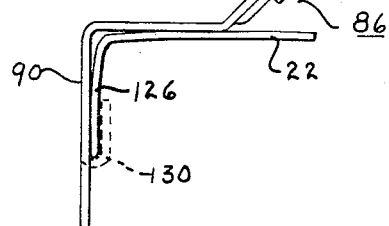
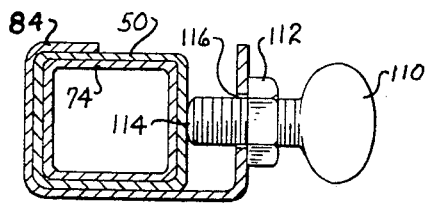
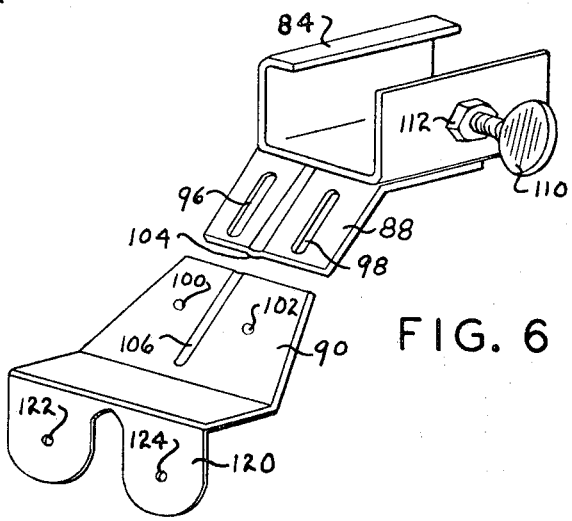
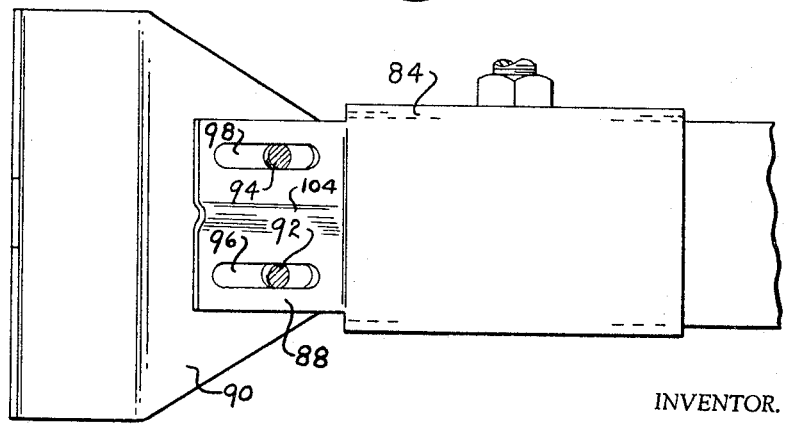

United States Patent Office 3,433,448
Patented Mar. 18, 1969

3,433,448
REARVIEW MIRROR SUPPORTING DEVICE
Charles A. Weber, 3431 Homer Ave.,
Elkhart, Ind. 46514
Filed Feb. 10, 1967, Ser. No. 615,155
U.S. Cl. 248—476     9 Claims
Int. Cl. B60r 1/02

ABSTRACT OF THE DISCLOSURE

A rearview mirror supporting device for automobiles and pickup trucks, which extends across the hood of the vehicle and engages the sides of the hood to secure it firmly in place on the hood, and which supports a mirror on an arm at one or both sides of the vehicle.

---

In recent years trailers, campers and mobile homes towed by cars have increased in size so that the conventional outside rearview mirrors are often no longer useful to the driver to see around or behind the towed vehicle. The conventional side-mounted rearview mirrors have usually been relatively small in size and have generally been mounted on the door or in close proximity thereto, and in easy reach of the occupants of the car. As the trailers and mobile homes have become larger and wider, the tendency has been to increase the size of the supporting bracket for the door mounted mirror and to extend the length thereof sufficiently to permit the driver to see along the side of the towed vehicle. The enlarged door mounted mirror supports not only have become difficult to mount securely and firmly on the door, but frequently have interfered with normal operation of the door or window therein, and often have required the use of holes in the side of the door which are readily visible whenever the mirror bracket is removed from the door. Further, in view of the rather limited usable space on the door for the bracket, adequate structural strength and bracing to prevent undue vibration and buffeting in the wind have not been possible or feasible. It is therefore one of the principal objects of the present invention to provide a device for supporting a rearview mirror on each side of an automobile or pickup truck, which is so constructed and so located on the car that it can be made sufficiently strong to be fully stable at high speeds and under severe wind conditions, and which can be easily mounted on a car without the use of any attachments on the car doors or door frames and without the use of any holes or slots in the car door, body panels, frame or trim.

Another object of the invention is to provide an outside rearview mirror supporting device which can be readily adjusted to fit a number of standard cars and pickup trucks, and thereafter adjusted to adapt the mirror to various size trailers, campers and mobile homes towed by the car, and which can be easily and quickly removed and stored when the car is not being used as a towing vehicle.

Still another object is to provide a rearview mirror support of the aforesaid type which can be mounted on the vehicle and adjusted to the proper position without the use of any tools or special equipment and which is sufficiently rigid in construction that no braces or supports along the side of the vehicle are required even though the mirror may be positioned a substantial distance from the vehicle sides.

Further objects and advantages of the invention will become apparent from the following description and accompanying drawings, wherein:

FIGURE 3 is an enlarged fragmentary side elevational view of the rearview mirror supporting device shown in the preceding figures;

FIGURE 4 is a fragmentary bottom view of the present device;

FIGURE 5 is a vertical cross sectional view of the device, the section being taken on line 5—5 of FIGURE 3;

FIGURE 6 is an exploded perspective view of one of the fixtures for holding the present mirror supporting device on the automobile.

Figure 1:
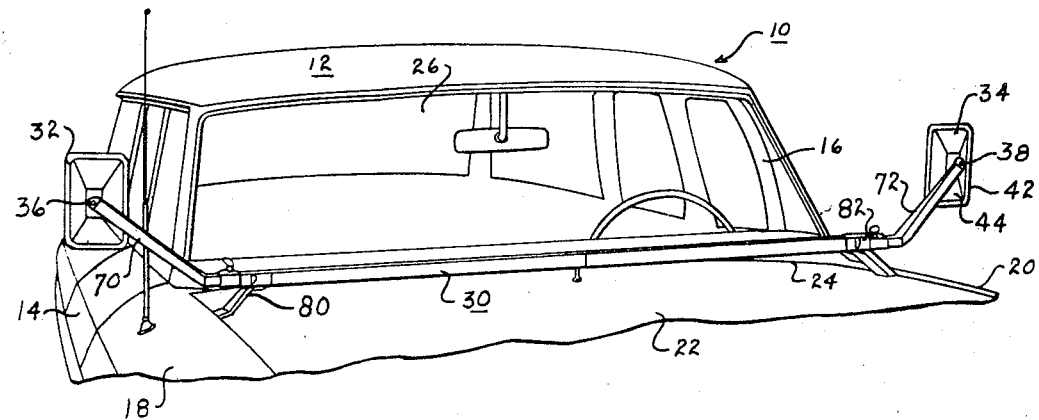
FIGURE 1 is a fragmentary perspective view of an automobile showing the present rearview mirror supporting device mounted thereon in operating position.
Figure 2:
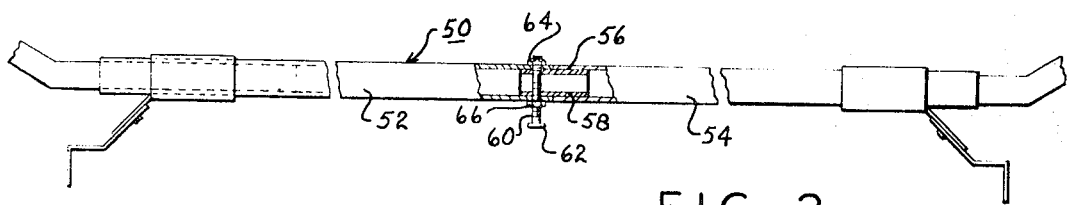
FIGURE 2 is a fragmentary side elevational and partial cross sectional view of the rearview mirror supporting device shown in FIGURE 1.

Referring more specifically to the drawings and to FIGURE 1 in particular, numeral 10 designates generally a passenger automobile having the conventional top 12, right and left hand doors 14 and 16, fenders 18 and 20, and hood 22, the hood being hinged along the line 24 at the rear thereof, adjacent the bottom of windshield 26. The present rearview mirror supporting device, designated by numeral 30, is mounted on and secured to the opposite sides of hood 22 and has right and left mirrors 32 and 34 secured to the supporting structure by swivel joints 36 and 38, respectively. The mirror may be of various sizes and shapes, depending upon the use intended and the preference of the driver. The mirror shown is relatively large and rectangularly shaped, having a formed metal frame 42 and back 44 to which the swivel joints 36 and 38 are connected. The swivel joint permits the mirror to be adjusted to various angular positions, both laterally and vertically, to accommodate various drivers and different size trailers and mobile homes.

The mirror supporting device consists of a body 50 having right and left square tubular sections 52 and 54 connected at the center of the body by a joint 56, joint 56 consisting of an inner sleeve 58 secured to section 54 and held in position in section 52 by a screw 60. Sleeve 58 is welded or otherwise held in place in the inner end of section 54 and slides readily into the inner end of section 52 where it is held by screw 60. The screw is adjustable vertically to permit the head 62 to rest on the hood and give support to the center of body 50, the screw being held in its adjusted position by nuts 64 and 66 above and below section 52.

Mirrors 32 and 34 are supported directly by angularly positioned arms 70 and 72 of tubular construction, each having an inner portion 74 of rectangular cross section for sliding into the outer end of body 50. Portions 74 are adjustable laterally, i.e., longitudinally in the ends of tubular body 50, to permit the mirror to be positioned various distances from the side of the automobile, and are held in adjusted positions by thumbscrews 76 in nuts 78, the inner end 77 of thumbscrews 76 extending through a hole 79 and engaging the external surface of portion 74. When it is desired to adjust arm 70 or 72 laterally, thumbscrews 76 are loosened, the adjustments made, and the thumbscrews retightened. It is seen from the foregoing telescopic relationship between body 50 and portions 74 that arms 70 and 72, and hence mirrors 32 and 34, can be adjusted over a wide range, from a position in close proximity to the side of the automobile to a substantial distance therefrom. Arms 70 and 72 must be at such an angle with relation to the front doors of the car that the mirrors will not interfere with fully opening the doors.

Body 50 is secured firmly to the hood by brackets 80 and 82, each consisting of a sleeve or clamp 84, slidable on the respective sections of body 50 and having fixtures 86, consisting of an upper tongue-like section 88 joined to a lower section 90, the two sections being held firmly in place by screws 92 and 94 extending through slots 96 and 98 and holes 100 and 102, respectively, in upper and lower sections 88 and 90. The screws are held in place by nuts on the lower side of the two sections. Section 88 contains a downwardly extending rib 104 for receiving channel 106 of section 90 and is joined rigidly to sleeve 84, either as an integral part thereof or as a separate part rigidly secured to the sleeve. Brackets 80 and 82 may be adjusted endwise on body 50 to adjust the device to various width hoods, by slipping sleeve 84 along the respective section of body 50. Each sleeve is held in place by a thumbscrew 110 threaded in nut 112 and having an inner end 114 extending through a hole 116 in the sleeve and seating on the external surface of the respective section of the body. When an adjustment is to be made, the thumbscrew is loosened, the sleeve slipped to the desired position, and the thumbscrew tightened firmly in place.

In one embodiment, the lower section 90 of fixture 86 is secured to the hood by dependent portion 120 having two holes 122 and 124 therein for receiving screws which extend therethrough into flange 126 of hood 22. The lower section 90 is rigidly secured to the hood, and upper portion 88 of each bracket is adjusted vertically to place body 50 in horizontal position, i.e., generally parallel with the surface of hood 22. This adjustment, which is made by loosening screws 92 and 94 and slipping section 88 vertically, may also be used to clear portions of the car body or hood, if such adjustments are necessary or desirable.

Figure 7:
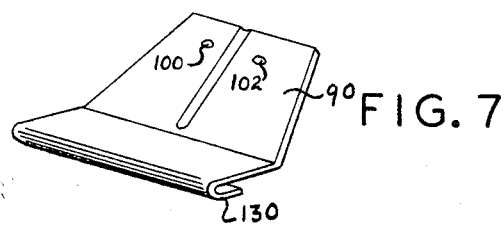
FIGURE 7 is a perspective view of a modified form of one of the parts of the fixture shown in FIGURE 6.

In the modified form in FIGURE 7, section 90 is provided with a U-shaped portion 130 which slips over a laterally extending flange on the side of the hood. The fixture is secured to the hood by first tightening screws 92 and 94, slipping the portion 130 over the flange of the hood, and pushing the two brackets 80 and 82 toward one another on body 50 until portions 130 of the two fixtures firmly grip the opposite sides of the hood. The thumbscrews 110 in each of the two brackets are then tightened, retaining the brackets in their adjusted position and portions 130 firmly in place over the lateral flanges of the hood.

In the installation and operation of the present rearview mirror supporting device, section 90 of each of brackets 80 and 82 is secured to the sides of the hood and thumbscrews 110 of the two brackets are tightened to secure the brackets rigidly in place on body 50. Arms 70 and 72 are then adjusted laterally at the outer ends of sections 52 and 54 and thumbscrews 76 at each end of the body are tightened to secure arms 70 and 72 in the adjusted position. The mirror is then adjusted to the proper angular position, using the swivel joint between the respective arms 70 and 72 and the mirror. It is seen that the present mirror can be quickly installed without the use of any exposed holes, and that it will remain in place as long as required and then can be easily removed by removing the screws along the side of the hood. If the modified form in FIGURE 7 is used, no screws along the side of the hood are required, and to remove the device, thumbscrews 110 in the two brackets 80 and 82 are loosened to permit the brackets to slip endwise on body 50. The present supporting device is basically relatively simple, consisting primarily of body 50, arms 70 and 72, and fixtures 80 and 82, and is strong, convenient to install and remove and attractive in appearance.

While only one embodiment of the present rearview mirror supporting device has been described in detail herein, various changes and modifications may be made without departing from the scope of the invention.

I claim:

1. A rearview mirror supporting device for a vehicle having a hood hinged at one end, comprising an elongated tubular body adapted to be positioned transversely with respect to the hood, an arm at each end of said body extending laterally and angularly rearwardly for supporting a mirror at the side of the vehicle, a support bracket of rigid construction adjacent each end of said body for connection with the respective side of the vehicle hood to hold the said body firmly in place on the hood for movement therewith as said hood is raised and lowered, means for adjusting each of said brackets longitudinally with respect to said tubular body, and means for adjusting the height of said bracket to vary the spacing of said body above the hood.

2. A rearview mirror supporting device as defined in claim 1 in which said body consists of two tubular sections joined together adjacent the center of the body and a member supporting the center of the body on the hood.

3. A mirror supporting device as defined in claim 2 in which said bracket contains a portion extending downwardly along the side of the hood for engagement therewith.

4. A mirror supporting device as defined in claim 1 in which said bracket contains a portion extending downwardly along the side of the hood for engagement therewith.

5. A mirror supporting device as defined in claim 1 in which a means is provided for adjusting said arms laterally with respect to the sides of the car and for retaining said arms in adjusted position.

6. A mirror supporting device as defined in claim 4 in which a means is provided for adjusting said arms laterally with respect to the sides of the car and for retaining said arms in adjusted position.

7. A mirror supporting device as defined in claim 6 in which said body consists of two tubular sections joined together adjacent the center of the body and a member supporting the center of the body on the hood.

8. A rearview mirror supporting device for a vehicle having a hood hinged at one end, comprising an elongated tubular body adapted to be positioned transversely with respect to the hood, an arm extending laterally and angularly rearwardly for supporting a mirror at one side of the vehicle, a support bracket of rigid construction adjacent each end of said body for connection with the respective side of the vehicle hood to hold said body firmly in place on the hood for movement therewith as the hood is raised and lowered, means for adjusting each of said brackets longitudinally with respect to said tubular body, and means for adjusting the height of said brackets to vary the spacing of said body above the hood.

9. A mirror supporting device as defined in claim 8 in which said laterally extending arm is telescopically arranged with respect to said body and one of said support brackets is adjustable longitudinally along said body.

References Cited

UNITED STATES PATENTS

| 2,271,616 | 2/1942 | Beale | 248—201 X |
| 2,728,502 | 12/1955 | Plantico | 224—42.1 |
| 2,783,367 | 2/1957 | Locke | 224—42.1 |
| 3,064,868 | 12/1962 | Treydte | 224—42.1 |
| 3,305,202 | 2/1967 | Christenson | 248—201 |

FOREIGN PATENTS 1,277,334 10/1961 France.

CHANCELLOR E. HARRIS, *Primary Examiner.*

U.S. Cl. X.R.

248—201